(12) United States Patent
Stavens et al.

(10) Patent No.: US 7,563,358 B2
(45) Date of Patent: Jul. 21, 2009

(54) PROCESS FOR THE PRODUCTION OF BENZENE, TOLUENE, AND XYLENES

(75) Inventors: Elizabeth L. Stavens, Seabrook, TX (US); Stephen H. Brown, Bernardsville, NJ (US); J. Scott Buchanan, Lambertville, NJ (US); Yun-Feng Chang, Houston, TX (US); Larry L. Iaccino, Seabrook, TX (US); Paul F. Keusenkothen, Houston, TX (US); John D. Y. Ou, Houston, TX (US); Randall D. Partridge, Califon, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 587 days.

(21) Appl. No.: 11/509,403

(22) Filed: Aug. 24, 2006

(65) Prior Publication Data

US 2008/0051615 A1 Feb. 28, 2008

(51) Int. Cl.
*C10G 35/06* (2006.01)
*C10G 35/085* (2006.01)
*C10G 35/095* (2006.01)

(52) U.S. Cl. ............... 208/138; 208/133; 585/419; 585/475; 585/489; 585/643

(58) Field of Classification Search ............ 208/133, 208/138, 141; 585/400, 407, 410, 483, 470, 585/481, 643
See application file for complete search history.

(56) References Cited

U.S. PATENT DOCUMENTS

| | | | |
|---|---|---|---|
| 3,293,192 A | 12/1966 | Maher et al. | |
| 3,402,996 A | 9/1968 | Maher et al. | |
| 3,625,879 A | 12/1971 | Horne et al. | |
| 3,928,174 A * | 12/1975 | Bonacci et al. | 208/80 |
| 3,945,913 A | 3/1976 | Brennan et al. | |
| 3,957,621 A | 5/1976 | Bonacci et al. | |
| 4,016,218 A | 4/1977 | Haag et al. | |
| 4,097,367 A | 6/1978 | Haag et al. | |
| 4,117,026 A | 9/1978 | Hag et al. | |
| 4,150,061 A | 4/1979 | Feinstein et al. | |
| 4,188,282 A * | 2/1980 | Tabak et al. | 208/134 |
| 4,211,886 A * | 7/1980 | Tabak et al. | 585/321 |
| 4,214,980 A | 7/1980 | Le Page et al. | |
| 4,235,701 A | 11/1980 | Kopf et al. | |
| 4,250,056 A | 2/1981 | Le Page et al. | |
| 4,435,274 A | 3/1984 | Juguin et al. | |
| 4,820,402 A | 4/1989 | Partridge et al. | |
| 5,001,296 A * | 3/1991 | Howley et al. | 585/489 |
| 5,037,529 A | 8/1991 | Dessau et al. | |
| 5,041,208 A | 8/1991 | Patridge et al. | |
| 5,328,595 A * | 7/1994 | Rainis | 208/138 |
| 5,476,823 A | 12/1995 | Beck et al. | |
| 5,482,617 A | 1/1996 | Collins et al. | |
| 5,520,033 A * | 5/1996 | Holmberg et al. | 70/202 |
| 5,685,972 A | 11/1997 | Timken et al. | |
| 5,792,338 A * | 8/1998 | Gosling et al. | 208/65 |
| 5,866,744 A | 2/1999 | Wu et al. | |
| 5,993,642 A | 11/1999 | Mohr et al. | |
| 5,994,603 A | 11/1999 | Mohr et al. | |
| 6,153,089 A | 11/2000 | Das et al. | |
| 6,900,365 B2 | 5/2001 | Chen et al. | |
| 6,602,403 B1 | 8/2003 | Steffens et al. | |
| 6,902,664 B2 | 6/2005 | Timken | |
| 2002/0183192 A1* | 12/2002 | Verduijn et al. | 502/67 |
| 2003/0040426 A1 | 2/2003 | Barrera et al. | |
| 2004/0186332 A1 | 9/2004 | Kong et al. | |
| 2005/0133410 A1 | 6/2005 | Li et al. | |

FOREIGN PATENT DOCUMENTS

| | | |
|---|---|---|
| EP | 271 264 A1 | 6/1988 |
| EP | 271 264 B1 | 6/1988 |
| FR | 2076358 | 1/1970 |
| FR | 2126565 | 5/1970 |
| FR | 2174727 | 3/1972 |
| FR | 2436627 | 9/1978 |
| WO | 2005/014169 | 2/2005 |
| WO | 2006/074254 | 7/2006 |

OTHER PUBLICATIONS

Miale, J. N. et al., Journal of Catalysis, "*Catalysis by Crystalline Aluminosilicates*," vol. 6, pp. 278-287, (1966).
Pecoraro et al., Journal of Catalysis, "*Hydrodesulfurization Catalysis by Transition Metal Sulfides*," vol. 67, pp. 430-445, (1981).
Toulhoat, H. et al., Catalysis Today, "*Transition Metals to Sulfur Binding Energies Relationship to Catalytic Activities In HDS: Back to Sabatier With First Principle Calculations*," vol. 50, pp. 629-636, (1999).

* cited by examiner

*Primary Examiner*—Walter D Griffin
*Assistant Examiner*—Jerrod B Marten

(57) ABSTRACT

A hydrocarbon conversion process for producing an aromatics product containing of benzene, toluene, xylenes, or mixtures thereof. The process is carried out by converting precursors of benzene, toluene, and xylenes that are contained in a hydrocarbon feed ($C_{6+}$ non-aromatic cyclic hydrocarbons, $A_{8+}$ single-ring aromatic hydrocarbons having at least one alkyl group containing two or more carbon atoms; and $A_{9+}$ single-ring aromatic hydrocarbons having at least three methyl groups) to produce a product that contains an increased amount of benzene, toluene, xylenes, or combinations thereof compared to said hydrocarbon feed.

41 Claims, 1 Drawing Sheet

PROCESS FOR THE PRODUCTION OF BENZENE, TOLUENE, AND XYLENES

FIELD

This invention relates to the production of benzene, toluene, and xylenes from a hydrocarbon feed containing precursors of benzene, toluene, and xylenes such as $C_{6+}$ non-aromatic cyclic hydrocarbons and alkylaromatic hydrocarbons.

BACKGROUND

Benzene, toluene, and xylenes (BTX) are very important petrochemical materials. The world wide demand for these hydrocarbons is increasing. The demand for xylenes, particularly para-xylene, has increased in proportion to the increase in demand for polyester fibers and film. Benzene is a highly valuable product for use as a chemical raw material. Toluene is also a valuable petrochemical for use as a solvent and intermediate in chemical manufacturing processes and as a high octane gasoline component.

Benzene, toluene, and xylenes can be made by various processes. Most aromatics production is based on the recovery of aromatics derived from the catalytic reforming of naphtha. Catalytic reforming processes utilize a feed containing $C_6$+ non-aromatic hydrocarbons and typically produce a reformate comprised of $A_6$-$A_8$ aromatics (benzene, toluene, xylenes) along with paraffins and heavier aromatics.

Another process for producing aromatics involves the dehydrocyclo-oligomerization of $C_2$-$C_5$ aliphatic hydrocarbons. That process typically produces a product comprised of benzene, toluene, xylenes, $C_5$+ paraffins, $C_{4-}$ light paraffins, olefins, and unreacted $C_2$-$C_5$ aliphatic hydrocarbons.

Still another process for producing aromatics involves the cracking of hydrocarbons such as by steam cracking or catalytic cracking. That process typically produces a cracked naphtha product comprised of $C_{6+}$ non-aromatic cyclic hydrocarbons, $A_6$-$A_8$ aromatic hydrocarbons (benzene, toluene, xylenes and ethylbenzene), and $A_{9+}$ aromatic hydrocarbons.

With the world wide demand for benzene, toluene, and xylenes steadily increasing, there is a need for additional benzene, toluene, and xylenes production to meet the market demands. The present invention provides a process for producing significant amounts of chemical grade BTX.

SUMMARY

In accordance with the present invention, there is provided a hydrocarbon conversion process for producing an aromatics product selected from the group consisting of benzene, toluene, xylenes, and mixtures thereof from a hydrocarbon feed comprising: (a) $C_{6+}$ non-aromatic cyclic hydrocarbons; (b) $A_{8+}$ single-ring aromatic hydrocarbons having at least one alkyl group containing two or more carbon atoms; and (c) $A_{9+}$ single-ring aromatic hydrocarbons having at least three methyl groups. The process is carried out by contacting the hydrocarbon feed in the presence of hydrogen with a catalyst comprising a molecular sieve selected from the group consisting of a large pore molecular sieve and an intermediate pore size molecular sieve, said molecular sieve having an alpha value in the range of from about 2 to about 100 and an effective amount of at least one Group VIII metal and under conditions sufficient (i) for forming aromatic hydrocarbons from $C_{6+}$ non-aromatic cyclic hydrocarbons, (ii) dealkylating $A_{8+}$ single-ring aromatic hydrocarbons having at least one alkyl group containing two or more carbon atoms; (iii) transalkylating $A_{9+}$ single-ring aromatic hydrocarbons having at least three methyl groups; and (iv) disproportionating toluene, to produce a product such that the product contains an increased amount of benzene, toluene, xylenes, or combinations thereof compared to said hydrocarbon feed.

In another embodiment, at least a portion of the multi-ring aromatics present in the hydrocarbon feed are converted to single-ring aromatics. In this embodiment, the process is preferably carried out in two reaction zones. In the first reaction zone, the hydrocarbon feed undergoes hydrocarbon conversion as described above to form a product containing an increased amount of benzene, toluene, xylenes, or combinations thereof compared to said hydrocarbon feed. In the second reaction zone, at least a portion of the multi-ring aromatics present in the hydrocarbon feed are converted to single-ring aromatics. Usually, at least a portion of the single-ring aromatics formed in the second reaction zone is recycled to the first reaction zone.

The hydrocarbon feed used in the present invention may contain sulfur in concentrations greater than 100 wppm, e.g., greater than 500 wppm. Preferably, the practice of the present invention results in a product containing reduced amounts of sulfur, e.g., less than 50 wppm of sulfur. More preferably, the product contains less than 5 wppm of sulfur, and, most preferably, the product contains no more than 1 wppm of sulfur.

In further embodiment, the product from the hydrocarbon conversion undergoes further conversion. Examples of such further conversion processes include the isomerization of ortho-xylene and/or meta-xylene to produce para-xylene, the methylation of benzene and/or toluene to produce xylenes, the disproportionation of toluene to produce xylenes and benzene, and the selective disproportionation of toluene to produce para-xylene and benzene.

BRIEF DESCRIPTION OF THE DRAWING

The FIGURE is a simplified process flow diagram illustrating an embodiment of the invention.

DETAILED DESCRIPTION OF THE EMBODIMENTS

Hydrocarbon Conversion Catalyst

Figure 1:
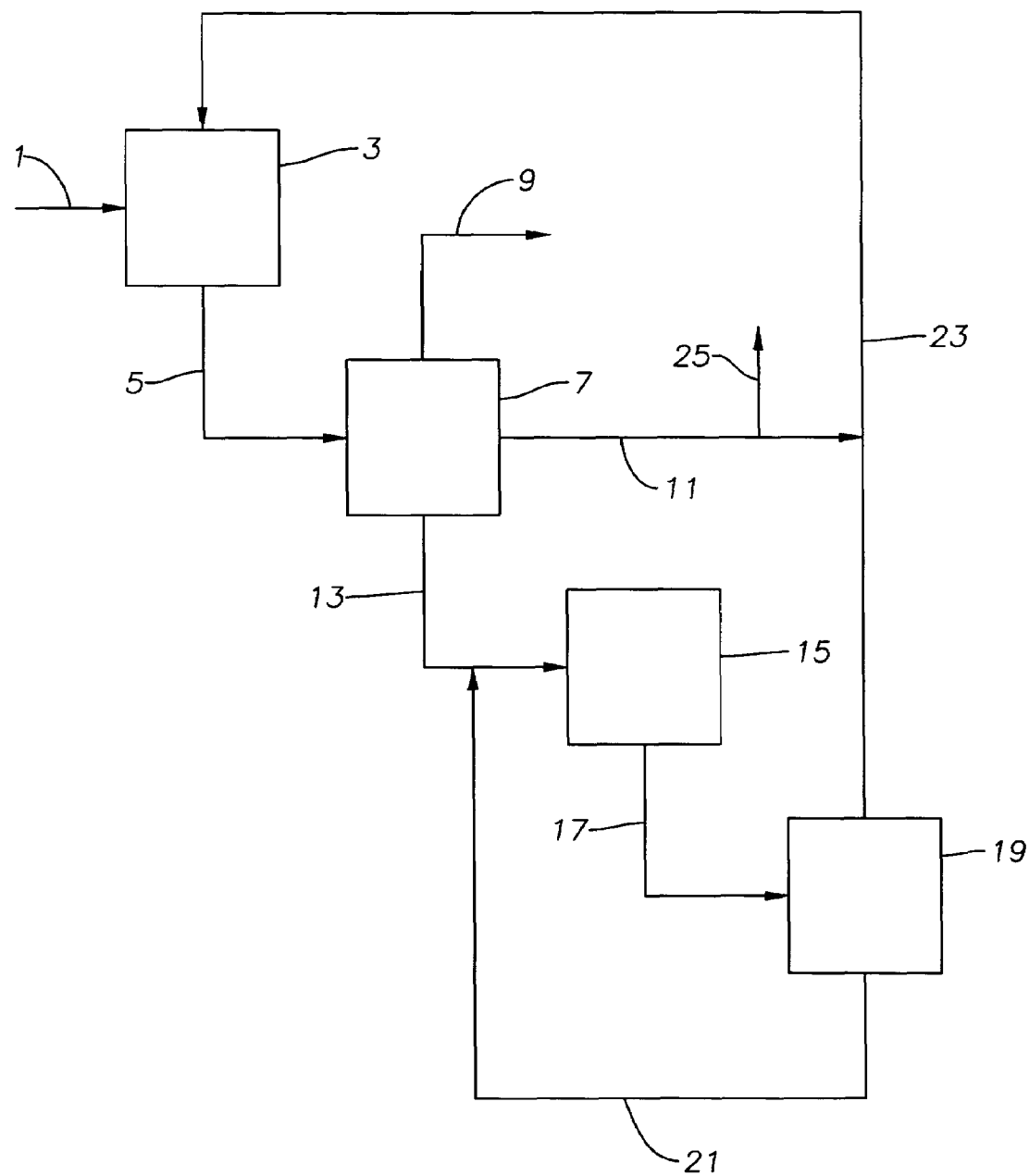

The catalyst used in the process of the present invention comprises a molecular sieve and at least one Group VIII metal. Suitable molecular sieves include large pore molecular sieves and intermediate pore size molecular sieves. These molecular sieves are described in "Atlas of Zeolite Framework Types", eds. Ch. Baerlocher, W. H. Meier, and D. H. Olson, Elsevier, Fifth Revised Edition, 2001, which is hereby incorporated by reference. A large pore molecular sieve has a pore size of at least about 7 Å and includes, for example, VFI, LTL, MAZ, MEI, FAU, EMT, OFF, *BEA, MTW, MWW, and MOR structure type molecular sieves (IUPAC Commission of Zeolite Nomenclature). Examples of specific large pore molecular sieves include Zeolite L, Zeolite Beta, Zeolite Y, Ultrastable Y (USY), Dealuminized Y (Deal Y), Mordenite, ZSM-3, ZSM-4, ZSM-18, ZSM-20, ZSM-12, MCM-22, and faujasite. An intermediate pore size molecular sieve has a pore size from about 5 Å to about 7 Å and includes, for example, MFI, MEL, MTW, EUO, MTT, HEU, FER, MFS, and TON structure type zeolites (IUPAC Commission of Zeolite Nomenclature). Examples of specific intermediate pore size molecular sieves include ZSM-5, ZSM-12, ZSM-22, ZSM-23, ZSM-34, ZSM-35, ZSM-38, ZSM-48, ZSM-50, and ZSM-57. The molecular sieve is preferably an aluminosilicate molecular sieve. Preferred molecular sieves include Ultrastable Y, Zeolite Beta, and Mordenite. The most preferred molecular sieve is USY. USY is described in detail in U.S. Pat. Nos. 3,293,192 and 3,402,996, which are hereby incorporated by reference.

The molecular sieve present in the catalyst will have an alpha value, before incorporation of the Group VIII metal, in the range of from about 2 to about 100. Preferably, the alpha value of the molecular sieve will be in the range of from about 3.0 to about 30 and, more preferably, in the range from about 3.5 to about 25.

The alpha value is a measure of molecular sieve acidic functionality and is described together with details of its measurement in U.S. Pat. No. 4,016,218 and in J. Catalysis, Vol. VI, pp. 278-287 (1966) and reference is made to these for such details. Higher alpha values correspond with a more active cracking catalyst.

Steaming to lower the alpha value of the molecular sieve to the values described above is typically achieved by heating the catalyst at a temperature of from about 100° C. to about 750° C., e.g., from about 175° C. to about 625° C., in an atmosphere containing from about 1% to about 100% steam, e.g., from about 50% to about 100% steam, at a partial pressure of from about 0.01 psia to about 50 psia (70 Paa to 345 kPaa), and for a duration of about 0.1 to about twenty-four hours, e.g., from about three to about six hours.

The catalyst will contain an effective amount of at least one Group VIII metal. Group VIII metals include platinum, palladium, rhodium, osmium, iridium, ruthenium, cobalt, nickel, and iron. Noble metals (platinum, palladium, rhodium, osmium, iridium, and ruthenium) are preferred. Most preferably, the Group VIII metal is platinum or palladium. Reference to Group VIII metal is intended to encompass Group VIII metal in the elemental state (i.e., zero valence) or some other catalytically active form such as an oxide, sulfide, halide, carboxylate, and the like.

The amount of Group VIII metal present in the catalyst will usually be an amount of at least about 0.01 percent by weight to about 3.0 percent by weight (based on the weight of the molecular sieve). The molecular sieve will preferably contain from about 0.02 percent by weight to about 2.5 percent by weight of Group VIII noble metal and, more preferably, will contain about 0.03 percent by weight to about 2.0 percent by weight of Group VIII noble metal. Most preferably, the molecular sieve will contain from about 0.05 percent to about 0.5 percent by weight of Group VIII metal, although the amount will vary with the nature of the Group VIII metal, with less of the highly active Group VIII metal being required than of the less active Group VIII metals.

The Group VIII metal may be incorporated into the catalyst by methods known in the art, such as by ion exchange, impregnation or by physically intimately admixing with the molecular sieve. Solutions of appropriate Group VIII metal salts may be used to incorporate the Group VIII metal into the catalyst. The Group VIII metal containing salt is preferably water soluble. Examples of such salts include chloroplatinic acid, platinum chloride and tetraammineplatinum and tetraamminepalladium complexes. After incorporation of the metal, the catalyst is calcined at a temperature of from about 200° C. to about 500° C.

Usually the molecular sieve will be incorporated with binder material resistant to the temperature and other conditions employed in the process. Suitable binder material include clays, alumina, silica, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The molecular sieve may also be composited with zeolitic material such as the zeolitic materials which are disclosed in U.S. Pat. No. 5,993,642, which is hereby incorporated by reference.

The relative proportions of molecular sieve and binder material will vary widely with the molecular sieve content ranging from between about 1 to about 99 percent by weight, more preferably in the range of about 10 to about 95 percent by weight of molecular sieve, and still more preferably from about 20 to about 90 percent.

Hydrocarbon Feed

The hydrocarbon feed used in the present invention will contain both non-aromatic cyclic hydrocarbons which can be converted to benzene, toluene, xylenes, or mixtures thereof and alkylaromatic hydrocarbons which can be converted to benzene, toluene, xylenes, or mixtures thereof. The hydrocarbon feed will contain $C_{6+}$ non-aromatic cyclic hydrocarbons, $A_{8+}$ single-ring aromatic hydrocarbons having at least one alkyl group containing two or more carbon atoms, and $A_{9+}$ single-ring aromatic hydrocarbons having at least three methyl groups. The amount of these hydrocarbons present in the hydrocarbon feed will vary widely.

Typical hydrocarbon feeds used in the present invention will usually contain at least about 5 percent by weight (based on the weight of hydrocarbons present in the feed) of $C_{6+}$ non-aromatic cyclic hydrocarbons ($C_{6+}$ naphthenes and $C_{6+}$ cyclic olefins), at least about 30 percent by weight (based on the weight of the hydrocarbon feed) of $A_{8+}$ single-ring aromatic hydrocarbons having at least one alkyl group containing two or more carbon atoms, and at least about 5 percent by weight (based on the weight of hydrocarbons present in the feed) of $A_{9+}$ single-ring aromatic hydrocarbons having at least three methyl groups.

Preferably, the hydrocarbon feed will contain from about 5 percent by weight to about 20 percent by weight of $C_{6+}$ non-aromatic cyclic hydrocarbons. More preferably, the feed will contain from about 7 percent by weight to about 15 percent by weight of $C_{6+}$ non-aromatic cyclic hydrocarbons. During hydrocarbon conversion, the $C_{6+}$ non-aromatic cyclic hydrocarbons undergo aromatization to form aromatic hydrocarbons. The $C_6+$ non-aromatic cyclic hydrocarbons are usually $C_6$-$C_{16}$ non-aromatic cyclic hydrocarbons. Preferably, the $C_6+$ non-aromatic cyclic hydrocarbons are $C_6$-$C_9$ non-aromatic cyclic hydrocarbons. More preferably, the hydrocarbon feed contains less than 5 weight percent of $C_{10}+$ non-aromatic cyclic hydrocarbons. Still more preferably, the hydrocarbon feed contains less than 1 weight percent of $C_{10}+$ non-aromatic cyclic hydrocarbons and, most preferably, the feed is essentially free of $C_{10}+$ non-aromatic cyclic hydrocarbons.

Non-limiting examples of suitable $C_{6+}$ non-aromatic cyclic hydrocarbons include alkylcyclopentanes such as methylcyclopentane and ethylcyclopentane, alkylcyclopentenes such as methylcyclopentene and ethylcyclopentene, cyclohexane, alkylcyclohexanes such as methylcyclohexane and ethylcyclohexane, cyclohexenes such as methylcyclohexene and ethylcyclohexene, dihydrocyclopentadienedimer, tetrahydrocyclopentadienedimer, decalins, cyclopentadienes, and cyclohexadienes. Additional examples of $C_{6+}$ non-aromatic cyclic hydrocarbons include ethylmethylcyclopentane and dimethylcyclopentane.

Preferably, the hydrocarbon feed used in the present invention will contain about 30 percent by weight to about 90 percent by weight (based on the weight of the hydrocarbon feed) of $A_{8+}$ single-ring aromatic hydrocarbons having at least one alkyl group containing two or more carbon atoms. More preferably, the feed will contain about 45 percent by weight to about 75 percent by weight of the $A_{8+}$ single-ring aromatic hydrocarbons. Preferred alkyl groups include ethyl, propyl and butyl. The feed will usually include $A_{8+}$ single-ring aromatic hydrocarbons having two, three or four alkyl groups with one or more of the alkyl groups containing two or more carbon atoms.

Non-limiting examples of the $A_{8+}$ single-ring aromatic hydrocarbons include ethylbenzene, diethylbenzenes such as 1,4-diethylbenzene, 1,2-diethylbenzene, and 1,3-diethylbenzene, triethylbenzenes such as 1,3,5-triethylbenzene, propylbenzenes, dipropylbenzenes, tripropylbenzenes, isopropylbenzenes, diisopropylbenzenes, triisopropylbenzenes, methylethylbenzenes, dimethylethylbenzenes, trimethylethylbenzenes, methyldiethylbenzenes, dimethyldiethylbenzenes, trimethyldiethylbenzenes, methyltriethylbenzenes, dimethyltriethylbenzene, methylpropylbenzenes, dimethylpropylbenzenes, trimethylpropylbenzenes, ethylpropylbenzenes, diethylpropylbenzenes, and triethylpropylbenzenes.

Preferably, the hydrocarbon feed used in the present invention will contain about 5 percent by weight to about 20 percent by weight (based on the weight of the hydrocarbon feed) of $A_{9+}$ single-ring aromatic hydrocarbons having at least three methyl groups. More preferably, the feed contains about 8 percent by weight to about 15 percent by weight of the $A_{9+}$ single-ring aromatic hydrocarbons.

Non-limiting examples of the $A_{9+}$ single-ring aromatic hydrocarbons include trimethylbenzenes such as mesitylene (1,3,5-trimethylbenzene), hemimellitene (1,2,3-trimethylbenzene), pseudocumene (1,2,4-trimethylbenzene) and tetramethylbenzene such as durene (1,2,4,5-tetramethylbenzene).

Usually, the hydrocarbon feed will contain at least about 25 percent by weight (based on the weight of the hydrocarbon feed) of $A_6$-$A_9$ single-ring aromatic hydrocarbons. Preferably, the hydrocarbon feed will contain from about 30 percent by weight to about 60 percent by weight of $A_6$-$A_9$ single-ring aromatic hydrocarbons. More preferably, the hydrocarbon feed will contain from about 40 percent by weight to about 50 percent by weight of $A_6$-$A_9$ single-ring aromatic hydrocarbons.

The hydrocarbon feed can contain $C_{5+}$ acyclic hydrocarbons, with the amount depending upon the source of the hydrocarbon feed. The amount of $C_{5+}$ acyclic hydrocarbons present in the feed will typically be at least 5 percent by weight of $C_{5+}$ acyclic hydrocarbons, (based on the weight of the hydrocarbon feed). During the hydrocarbon conversion, at least a portion of the $C_{5+}$ acyclic hydrocarbons are concurrently cracked to lower boiling products. More preferably, at least 50 percent of the $C_{5+}$ acyclic hydrocarbons are cracked to lower boiling products. Still more preferably, at least 90 percent of the $C_{5+}$ acyclic hydrocarbons are cracked to lower boiling products. Most preferably, the product is essentially free of $C_{5+}$ non-aromatic hydrocarbons.

The hydrocarbon feed may also contain impurities such as olefins, dienes, nitrogen, and sulfur. The sulfur, nitrogen, olefins, and dienes content of the feed will depend on the source of the feed. Techniques for removing the sulfur, nitrogen olefins, and dienes present in the feed are known to people skilled in the art.

Olefins, and dienes can be present in the feed in amounts greater than 100 wppm (weight ppm, based on the weight of the hydrocarbon feed). These impurities can be removed either before conversion or during conversion. A preferred technique for removing olefins, diolefins, or mixtures is by contacting them with hydrogen to convert them to paraffins or naphthenes.

Sulfur and nitrogen impurities can be present in the hydrocarbon feed in amounts greater than 500 wppm (weight ppm, based on the weight of the hydrocarbon feed) and 5 wppm respectively. These impurities can be removed either before conversion or during conversion. One technique for removing sulfur and nitrogen from the hydrocarbon feed involves pretreating the feed with a hydrotreating catalyst, which is suitably a conventional hydrotreating catalyst, such as a combination of a Group VI and a Group VIII metal on a suitable refractory support such as alumina, under hydrotreating conditions. Under these conditions, at least some of the sulfur and nitrogen is separated from the feed molecules and converted to hydrogen sulfide and ammonia respectively, to produce a hydrotreated feed having lower sulfur and nitrogen content. In addition, sulfur and nitrogen can be removed during conversion. Conversion catalysts, such as catalysts comprising USY having an alpha value of at least 17 and an effective amount of platinum, can sometimes remove sulfur and nitrogen without significant deactivation of the catalyst, depending upon the composition of the feed and the reaction conditions. Preferably, the product from the conversion contains less than 100 wppm of sulfur, nitrogen, and dienes. The nitrogen content is not as characteristic of the feed as the sulfur content and is preferably not greater than about 50 wppm although higher nitrogen levels typically up to about 150 wppm may be found in certain feeds.

The feed can also contain multi-ring aromatic compounds. Such compounds are exemplified by indanes (2-rings) naphthalenes (2-rings), anthracenes (3-rings), pyrenes (4-rings). Naphthalenes are exemplified by naphthalene and monoalkynaphthalenes such as 1-methylnaphthalene and 3-ethylnaphthalenes, dialkylnaphthalenes such as 1,2-dimethylnaphthalene, 1,2-diethylnaphthalene 2,3-dimethylnaphthalene, 2,3-dipropylnaphthalene 2,6-dimethylnaphthalene, and 2,6-dibutyl-naphthalene. When the feed contains such compounds, they can be converted to single-ring aromatics, single-ring $C_{6+}$ non-aromatic cyclic hydrocarbons or mixtures thereof. Techniques for converting multi-ring aromatic compounds to single-ring hydrocarbons are known to people skilled in the art. The multi-ring aromatic compounds can be converted to single-ring hydrocarbons before the multi-ring aromatic compounds enter the reaction zone or after the feed has undergone conversion. In a preferred embodiment, the reaction zone comprises a first stage and a second stage. The forming of aromatic hydrocarbons from $C_{6+}$ non-aromatic cyclic hydrocarbons, the dealkylation of the $A_{8+}$ single-ring aromatic hydrocarbons containing at least three methyl groups, and the transalkylation of said $A_{9+}$ single-ring aromatic hydrocarbons, and the disproportionation of toluene takes place in the first stage. In the second stage, the multiring aromatics are converted to single-ring hydrocarbons.

The hydrocarbon feed used in the process of the present invention may be derived from several sources. Preferably, the feed is derived from the cracking of hydrocarbons. A preferred hydrocarbon feed is steam cracked naphtha because this feed is usually rich in $C_{6+}$ single-ring aromatic hydrocarbons. Thus, steam cracked naphtha can have high concentrations of toluene and $C_{9-10}$ aromatics fractions which contain many molecules that are BTX precursors. Alternatively, the cracking process may be a fluid catalytic cracking (FCC) process or a thermo catalytic cracking (TCC) process. Particularly preferred feeds are heavy debenzenized steam cracked naphtha and the fraction of steam cracked naphtha boiling between benzene and indane. Other suitable feeds include FCC Light Cat Cycle Oil (LCCO) or FCC Heavy Cat Naphtha (HCN).

Process Conditions

The hydrocarbon feed is usually mixed with hydrogen-containing gas, preheated to suitable temperature, and then transferred to the reaction zone. Reaction conditions used to carry out the process are not narrowly defined, but generally include a temperature from 350 to 600° C., a pressure from about 1 atm (101 KPaa) to about 50 atm (5050 KPaa), a hydrocarbon weight hourly space velocity between 0.1 and 10, and a hydrogen to hydrocarbon molar ratio from about 0.5 to 10. More preferably, the process conditions include a temperature from 380 to 580° C., a pressure from 2 atm (202 KPaa) to 20 atm (2020 KPaa), a hydrocarbon weight hourly space velocity between 1.0 and 10, and a hydrogen to hydrocarbon molar ratio from about 1.0 to 10.

The practice of the invention results in concurrent aromatization, dealkylation, and transalkylation of aromatic hydrocarbons and disproportionation of toluene to form benzene, toluene, xylenes or mixtures thereof. In addition, $C_{5-}$ non-aromatic hydrocarbons present in the feed are concurrently cracked to lower boiling products.

The $C_{6+}$ non-aromatic cyclic hydrocarbons ($C_{6+}$ naphthenes and $C_{6+}$ cyclic olefins) undergo aromatization to form the corresponding $C_{6+}$ aromatic hydrocarbons.

The $A_{8+}$ single-ring aromatic hydrocarbons having at least one alkyl group containing two or more carbon atoms, e.g., ethylbenzene, propylbenzene ethylpropylbenzene, undergo selective dealkylation of the alkyl groups containing two or more carbon atoms. Thus, ethylbenzene and ethylpropylbenzene are dealkylated to form benzene. In the case of $C_{8+}$ single-ring aromatic hydrocarbons having two alkyl groups and one group is methyl and the other contains two or more carbon atoms, e.g., methylpropylbenzenes, the alkyl groups containing two or more carbon atoms are selectively dealkylated while the methyl group remains on the ring. Thus, in the case of methylethylpropylbenzene, the ethyl and propyl groups are selectively dealkylated to form toluene which can undergo disproportionation to form xylenes and benzene. In the case of dimethylpropylbenzene, the propyl group is selectively dealkylated.

The $A_{9+}$ single-ring aromatic hydrocarbons having at least three methyl groups are involved in transalkylation. This reaction involves molecular rearrangement such as the transfer of methyl groups to form toluene or xylenes products. In conjunction therewith, toluene (toluene present in the hydrocarbon feed, toluene formed in the conversion process, and toluene recycled to fresh hydrocarbon feed) can undergo disproportionation and form benzene and xylenes.

One of the features of the present invention is that the amount of hydrogen produced by the aromatization of the $C_{6+}$ non-aromatic cyclic hydrocarbons is usually about equal to the amount of hydrogen consumed in the dealkylation of the $A_{8+}$ single-ring aromatic hydrocarbons. This hydrogen production/hydrogen consumption balance means that the process is close or equal to thermo-neutral, which enables the use of low-cost reactor technology, since heat transfer is removed as a significant issue.

Preferably, at least a portion of the toluene contained in the aromatics product is recycled to the reaction zone. The recycled toluene then undergoes transalkylation and disproportionation. In addition to increasing xylenes and benzene in the aromatics product by the transalkylation and disproportionation of toluene during hydrocarbon conversion, it is believed that the toluene recycle helps in reducing the formation of compounds having two rings (naphthalenes and indanes) which can cause catalyst deactivation. Also, with toluene recycle, highly reactive $C_{10}$ non-aromatics, such as dicyclopentadiene [DCPD] and DCPD-derivatives, are diluted, which helps to slow the rate of catalyst deactivation.

Preferably, the product produced by the hydrocarbon conversion process will contain at least 25 percent by weight of toluene (based on the weight of benzene, toluene, and xylenes present in the product). More preferably, the product produced by the hydrocarbon conversion process will contain at least 35 percent by weight of toluene. Most preferably, the product will contain at least 50 percent by weight of toluene.

The FIGURE is a simplified schematic flow diagram of an embodiment of the present invention illustrating the practice of the invention using two reaction zones and the hydrocarbon feed containing multi-ring aromatic compounds.

Referring to the FIGURE, hydrocarbon feed is sent via line 1 to conversion zone 3. In conversion zone 3, the hydrocarbon feed undergoes hydrocarbon conversion to form an aromatics product having enhanced amounts of benzene, toluene, xylenes, or mixtures thereof. Also, the amount of sulfur present in the hydrocarbon feed is reduced during the conversion.

Next, the product in conversion zone 3 is sent via line 5 to separation zone 7. In separation zone 7, $C_{8-}$ hydrocarbons, $C_{9/10}$ hydrocarbons, and $C_{10+}$ hydrocarbons are separated into fractions. The $C_{8-}$ hydrocarbon fraction is removed from separation zone 7 via line 9. The $C_{9/10}$ hydrocarbon fraction is removed from separation zone 7 via line 11. The $C_{10+}$ hydrocarbon fraction is removed from separation zone 7 via line 13. After removal, the $C_{10+}$ hydrocarbon fraction is sent to reaction zone 15 for cracking of the multi-ring aromatics to single-ring aromatics, $C_{6+}$ non-aromatic cyclic hydrocarbons, or mixtures thereof. The cracked product is removed from reaction zone 15 via line 17 and sent to separation zone 19 for separation of a $C_{10+}$ hydrocarbon fraction and a $C_{9-}$ hydrocarbon fraction. The separated $C_{10+}$ hydrocarbon fraction is removed from reactor zone 19 via line 21 and recycled back to reactor zone 15 via lines 21 and 13. The separated $C_{9-}$ hydrocarbons are removed from reactor zone 19 via line 23 and recycled back to conversion zone 3. The FIGURE shows recycling of the $C_{9/10}$ hydrocarbon fraction to conversion zone 3 via lines 11 and 23. Alternatively, the $C_{9/10}$ hydrocarbon fraction can be recovered directly from line 11 via line 25. The feed used in this embodiment is preferably a feed that contains significant amounts of multi-ring aromatics. Examples of such feeds include FCC Light Cat Cycle Oil (LCCO) and FCC Heavy Cat Naphtha (HCN).

The process can be conveniently operated in conventional equipment and the aromatics product can be recovered using conventional equipment.

The aromatics product produced by the present invention can undergo further hydrocarbon conversion with or without intermediate separation of the aromatics product. Examples of such hydrocarbon conversion processes include the methylation of benzene/toluene to produce xylenes, the disproportionation of toluene to form xylenes and benzene, and the selective disproportionation of toluene to form benzene and greater than equilibrium amounts para-xylene. For the disproportionation of toluene, the hydrocarbon feed undergoing hydrocarbon conversion can be tailored so that the aromatics product contains enhanced amounts of toluene. One method of tailoring of the feed is to include enhanced amounts of $C_7$ non-aromatic cyclic hydrocarbons in the feed.

Disproportionation of toluene is carried out by contacting toluene under disproportionation conditions with a catalyst comprising an intermediate pore size molecular sieve to yield a product mixture which comprises a mixture of unreacted (unconverted) toluene and benzene and xylenes.

The catalyst used in the toluene disproportionation reaction will preferably comprise an intermediate pore size molecular sieve. Examples of suitable intermediate pore size molecular sieves includes, for example, AEL, AFI, MWW, MFI, MEL, MFS, MEI, MTW, EUO, MTT, HEU, FER, and TON structure type molecular sieves. Preferred molecular sieves are titanosilicate, gallosilicate, aluminosilicate, and gallium-containing aluminosilicate molecular sieves having a MFI structure. Examples of suitable intermediate pore size molecular sieves include ZSM-5, ZSM-11, ZSM-12, ZSM-22, ZSM-23, ZSM-34, ZSM-35, ZSM-38, ZSM-48, ZSM-50, ZSM-57, MCM-22, MCM-49, and MCM-56. When the molecular sieve is an aluminosilicate MFI structure type molecular sieve (ZSM-5), it usually has a silica to alumina mole ratio molar from 20:1 to 200:1.

Typical reaction conditions used to carry out the toluene disproportionation process are not narrowly defined, but generally include a temperature from 350 to 600° C., a pressure from 101 kPaa (1 atm) to 5050 kPaa (50 atm), a hydrocarbon weight hourly space velocity between 0.1 and 10 $h^{-1}$, and a hydrogen to hydrocarbon molar ratio from about 0.5 to 10. To make enhanced amounts (greater than equilibrium amounts) of para-xylene (versus the other xylene isomers), the molecular sieve catalyst, e.g., ZSM-5 catalyst, is selectivated by the use of a selectivating agent.

Examples of compounds for selectivating the catalysts include treating the surface of the catalyst with compounds of phosphorus and/or various metal oxides such as alkaline earth metal oxides, e.g., calcium oxide, magnesium oxide, etc. rare earth metal oxides, lanthanum oxide, and other metal oxides such as boron oxide, titania, antimony oxide, and manganese oxide.

Selectivation may also be accomplished by depositing coke on the catalyst or treating the catalyst with silica.

Where the catalyst component is to be selectivated with silica, this is conveniently achieved by subjecting the catalyst to one or more treatments with an organosilicon compound in a liquid carrier, each treatment being followed by calcination of the treated material in an oxygen-containing atmosphere, e.g., air. Such a multiple selectivation procedure is described in U.S. Pat. No. 5,476,823, the entire contents of which are incorporated herein by reference. Where the catalyst to be silica-selectivated includes a binder, it is preferable to employ a non-acidic binder, such as silica.

The organosilicon compound, which is used to selectivate the first catalyst component may, for example, be a silicone, a siloxane, a silane or mixture thereof. These organosilicon compounds may have at least 2 silicon atoms per molecule. These organosilicon compounds may be solids in pure form, provided that they are soluble or otherwise convertible to the liquid form upon combination with the liquid carrier medium. The molecular weight of the silicone, siloxane or silane compound employed as a preselectivating agent may be between about 80 and about 20,000, and preferably within the approximate range of 150 to 10,000. Representative preselectivation silicone compounds include dimethyl silicone, diethyl silicone, phenylmethyl silicone, methylhydrogen silicone, ethylhydrogen silicone. phenylhydrogen silicone, methylethyl silicone, phenylethyl silicone, diphenyl silicone, methyltrifluoropropyl silicone, ethyltrifluoropropyl silicone, polydimethyl silicone, tetrachlorophenylmethyl silicone, tetrachlorophenylethyl silicone, tetrachlorophenylhydrogen silicone, tetrachlorophenylphenyl silicone, methylvinyl silicone, and ethylvinyl silicone. The preselectivating silicone, siloxane or silane compound need not be linear, but may be cyclic, for example, hexamethyl cyclotrisiloxane, octamethyl cyclotetrasiloxane, hexaphenyl cyclotrisiloxane and octaphenyl cyclotetra-siloxane. Mixtures of these compounds may also be used as preselectivating agents, as may silicones with other functional groups.

Typically, the kinetic diameter of the organosilicon compound, that is used to preselectivate the molecular sieve, is larger than the molecular sieve pore diameter, in order to avoid entry of the organosilicon compound into the molecular sieve pores and any concomitant reduction in the internal activity of the molecular sieve.

Suitable organosilicon preselectivating agents, particularly when the preselectivating agent is dissolved in an organic carrier or emulsified in an aqueous carrier, include dimethylphenyl methyl polysiloxane (e.g., Dow-550) and phenylmethyl polysiloxane (e.g., Dow-710). Dow-550 and Dow-710 are available from Dow Chemical Co., Midland, Mich.

The liquid carrier for the organosilicon compound may be an organic compound, such as a linear, branched or cyclic hydrocarbon having five or more, especially 7 or more, carbon atoms per molecule, e.g., an alkane, such as heptane, octane, nonane or undecane. The boiling point of the organic compound, e.g., alkane, may be greater than about 70° C. Mixtures of low volatility organic compounds, such as hydrocracker recycle oil, may be employed as carriers. Suitable organic carriers are decane and dodecane.

Following each impregnation with the organosilicon compound, the catalyst is calcined at a rate of from about 0.2° C./minute to about 5° C./minute to a temperature greater than 200° C., but below the temperature at which the crystallinity of the molecular sieve is adversely affected. This calcination temperature will generally be below 600° C. and preferably is within the approximate range of 350 to 550° C. The duration of calcination at the calcination temperature may be from 1 to 24 hours, e.g., from 2 to 6 hours.

In addition to, or in place of, silica selectivation, the catalyst may be subjected to coke selectivation. This optional coke selectivation typically involves contacting the catalyst with a thermally decomposable organic compound at an elevated temperature in excess of the decomposition temperature of said compound but below the temperature at which the crystallinity of the molecular sieve is adversely affected. This contact temperature may be, for example, less than about 650° C. Organic materials, which may be used for this coke selectivation process, encompass a wide variety of compounds including by way of example, hydrocarbons, such as paraffins, cycloparaffins, olefins, cycloolefins and aromatics; oxygen-containing organic compounds, such as alcohols, aldehydes, ethers, ketones and phenols; and heterocyclics, such as furans, thiophenes, pyrroles and pyridines. A hydrogen cofeed may be used to deter the excessive build-up of coke. Further details regarding coke selectivation techniques are provided in the U.S. Pat. No. 4,117,026, incorporated by reference herein. By using a combination of silica selectivation followed by coke selectivation, the number of organosilicon impregnation treatments required to achieve a particular xylene diffusivity can be reduced.

Catalysts particularly suited for toluene disproportionation include zeolite bound zeolite catalysts. These catalysts, as well as their method of preparation, are described in U.S. Pat. No. 5,994,603. The zeolite bound zeolite catalysts will comprise first crystals of an acidic intermediate pore size first molecular sieve and a binder comprising second crystals of a second molecular sieve. Preferably, the zeolite bound zeolite catalyst contains less than 10 percent by weight based on the total weight of the first and second zeolite of non-zeolitic binder, e.g., amorphous binder. An example of such a catalyst comprises first crystals of a MFI or MEL structure type, e.g., ZSM-5 or ZSM-11, and a binder comprising second crystals of MFI or MEL structure type, e.g., Silicalite 1 or Silicalite 2.

Usually the molecular sieve will be incorporated with binder material resistant to the temperature and other conditions employed in the process. Binder material and relative proportions of molecular sieve and binder material include the binder materials and proportions described above for the hydrocarbon conversion catalyst.

EXAMPLE 1

Preparation of Catalyst A

A catalyst was prepared (Catalyst A) that comprised USY molecular sieve and 0.6% by weight platinum. The catalyst had an alpha value of 7.

Platinum was incorporated into the catalyst by ion-exchange. The ion exchange was carried out at ambient temperature and under constant shaking at 60 rpm. Next, the platinum-containing sample was washed thoroughly on a filter with de-ionized water. The filtercake was then dried at 110° C. in a vacuum oven for 2 hours, then calcined in a muffle furnace using a ramp of 3° C./min from ambient temperature to 150° C. and held at 150° C. for 30 minutes then 2° C./min from 150° C. to 550° C. and held at 550° C. for 60 minutes in nitrogen flow at 500 cc/min, then switched to air flow at 500 cc/min at 550° C. for another 60 minutes. The catalyst was cooled down and pelletized to a 25 mm diameter and 2 mm thick disk. The disk was then crushed and sieved to give particles of 25-10 mesh.

EXAMPLE 2

Catalyst A was tested using a debenzenized steam cracked naphtha feed (HDBSCN). The feed contained $C_5$ to $C_{14}$ hydrocarbons. The feed also contained 148 wppm of sulfur.

Sulfur analysis of the feed was determined by gas chromatography using a sulfur sensitive detector. The hydrocarbon composition of the feed is set forth below in Table 1.

The test was carried out in a fix bed tubular reactor and in a down flow manner. An amount of 3.0 grams of Catalyst A was mixed with 4.0 grams of quartz chips and then packed into the middle section of the tubular reactor to form a bed length of 12 to 13 cm. Am amount of 30 to 35 cm of quartz chips bed was contained above and below the catalyst bed. A multi-point thermal couple was installed in the center of the reactor to monitor reactor temperature. Catalyst A was first purged with inert gas (nitrogen) then with hydrogen at 200 cc/min, then heated up in hydrogen flow at 250 psig from room temperature to reaction temperature at 1° C./min. The reaction temperature was 950° F. Once the reaction temperature was reached, the feed was introduced at a rate of 2 WHSV and hydrogen to feed molar ratio was 5 to 1 at 250 psig. The resulting products were analyzed by on-line GC with a FID detector. Hydrocarbons from methane to $C_{13}$-$C_{14}$ species were quantified based on retention time. Sulfur analysis of the products was carried out using a sulfur specific detector and mass spectrometer. The amount of sulfur in the resulting feed was no more than 0.1 wppm The results of the test are shown below in Table 1.

TABLE 1

| Component | Feed Composition | Product Composition |
|---|---|---|
| $C_{5-}$ Gas (wt %) | 0.1 | 18.4 |
| $C_{6+}$ non-aromatics (wt %) | 21.4 | 1.0 |
| Benzene (wt %) | 0.0 | 11.2 |
| Toluene (wt %) | 19.2 | 30.2 |
| Ethylbenzene (wt %) | 11.5 | 4.8 |
| Xylenes (wt %) | 13.0 | 17.1 |
| Indanes/Indenes (wt %) | 3.9 | 0.3 |
| $C_9$ Aromatics (wt %) | 13.9 | 5.5 |
| $C_{10+}$ Aromatics (wt %) | 12.7 | 1.1 |
| $A_{10+}$ (two-ring aromatics) (wt %) | 4.3 | 10.7 |
| $H_2$ Consumption (wt %) | — | −0.3 |
| Sulfur (wppm) | 148 | 1 |

The results of the tests show the production of significant amounts of BTX (11.2 lb of benzene, 30.2 lb of toluene, and 21.9 lb of $A_8$ mixed xylenes plus ethylbenzene where ethylbenzene represents about 22% of the $A_8$ fraction). In addition, the conversion reduced the level of sulfur to 1 wppm. Furthermore, over 95 weight percent of the $C_{6+}$ non-aromatic hydrocarbons were converted.

EXAMPLE 3

Example 3 was carried out in the same manner as Example 2 except that about 30 wt % of toluene was added to the HDBSCN fresh feed. Thus, the feed used in Example 3 contained about 76% fresh HDBSCN feed and about 24% added toluene.

The composition of the hydrocarbon feed and test results are set forth below in Table 2.

TABLE 2

| | | Product | | |
|---|---|---|---|---|
| Component | HDBSCN (wt %) | wt % | lb (Based on 130.2 lb feed) | Net Production (Δlbs) | % Change from Example 2 |
| $C_{5-}$ Gas | 0.0% | 14.0 | 18.3 | −0.2 | |
| $C_{6+}$ non-aromatics | 16.3% | 1.2 | 1.5 | 0.5 | |

TABLE 2-continued

| | | Product | | |
|---|---|---|---|---|
| Component | HDBSCN (wt %) | wt % | lb (Based on 130.2 lb feed) | Net Production (Δlbs) | % Change from Example 2 |
| Benzene | 0.0% | 10.3 | 13.5 | 2.3 | 20% |
| Toluene | 40.7% | 42.1 | 54.9 | −5.6 | −18% |
| Ethylbenzene | 9.3% | 4.0 | 5.2 | 0.4 | 8% |
| Xylenes | 10.4% | 14.4 | 18.8 | 1.7 | 10% |
| Indanes/Indenes | 2.9% | 0.8 | 1.0 | 0.7 | |
| $C_9$ Aromatics | 10.6% | 4.3 | 5.7 | 0.2 | |
| $C_{10+}$ Aromatics | 7.6% | 1.2 | 1.5 | 0.4 | |
| $A_{10+}$ (2-ring) | 2.1% | 7.9 | 10.3 | −0.4 | |
| $H_2$ Consumption | — | −0.2 | −0.3 | 0.1 | |

The results in Table 2 show that the addition of toluene to the feed resulted in increased benzene and xylenes production. In more detail, the results shown in Table 2 show an increase of 18 percent in the production of $A_8$ (mixed xylenes and ethylbenzene [ethylbenzene represents about 22% of the $A_8$ fraction]) and an about 20% gain in production of benzene. Toluene disproportionation was observed.

What is claimed is:

1. A process for producing an aromatics product selected from the group consisting of benzene, toluene, xylenes, and mixtures thereof from a hydrocarbon feed comprising: (a) $C_{6+}$ non-aromatic cyclic hydrocarbons; (b) $A_{8+}$ single-ring aromatic hydrocarbons having at least one alkyl group containing two or more carbon atoms; and (c) $A_{9+}$ single-ring aromatic hydrocarbons having at least three methyl groups, said process comprising:

contacting said feed in the presence of hydrogen and with a catalyst comprising an effective amount of at least one Group VIII metal and a molecular sieve selected from the group consisting of a large pore molecular sieve and an intermediate pore size molecular sieve, said molecular sieve having an alpha value, before incorporation of said Group VIII metal, from about 2 to less than 100 and under conditions sufficient for (i) forming aromatic hydrocarbons from $C_{6+}$ non-aromatic cyclic hydrocarbons, (ii) dealkylating $A_{8+}$ single-ring aromatic hydrocarbons having at least one alkyl group containing two or more carbon atoms; (iii) transalkylating $A_{9+}$ single-ring aromatic hydrocarbons having at least three methyl groups; and (iv) disproportionating toluene, to produce a product such that said product contains an increased amount of benzene, toluene, xylenes, or combinations thereof compared to said hydrocarbon feed.

2. The process of claim 1, wherein said molecular sieve is an intermediate pore size molecular sieve.

3. The process of claim 2, wherein said intermediate pore size molecular sieve is ZSM-5.

4. The process of claim 1, wherein said molecular sieve is a large pore molecular sieve.

5. The process of claim 4, wherein said large pore molecular sieve is selected from the group consisting of USY, Beta, ZSM-12, MCM-22, and Mordenite.

6. The process of claim 5, wherein said large pore molecular sieve is USY.

7. The process of claim 5, wherein said catalyst further comprises a binder.

8. The process of claim 5, wherein said alpha value of said molecular sieve is in the range of from about 3.5 to about 25.

9. The process of claim 5, wherein said Group VIII metal is platinum, palladium, or mixtures thereof.

10. The process of claim 9, wherein said Group VIII metal is platinum.

11. The process of claim 5, wherein said Group VIII metal is present in said catalyst in an amount of from about 0.05 percent to about 0.5 percent by weight (based on the weight of the molecular sieve).

12. The process of claim 5, wherein said hydrocarbon feed contains sulfur in a concentration greater than 100 wppm and said product contains less than 5 wppm of sulfur.

13. The process of claim 5, wherein said hydrocarbon feed contains $C_{5+}$ acyclic hydrocarbons and at least 90 percent of said $C_{5+}$ acyclic hydrocarbons are cracked to lower boiling products.

14. The process of claim 5, wherein said hydrocarbon feed contains at least about 25 percent by weight (based on the weight of the hydrocarbon feed) of $A_6$-$A_9$ single-ring aromatic hydrocarbons.

15. The process of claim 5, wherein said hydrocarbon feed contains at least about 5 percent by weight (based on the weight of the hydrocarbons present in the feed) of $C_{6+}$ non-aromatic cyclic hydrocarbons, at least about 30 percent by weight (based on the weight of the hydrocarbons present in the feed) of $A_{8+}$ single-ring aromatic hydrocarbons having at least one alkyl group containing two or more carbon atoms, and at least about 5 percent by weight (based on the weight of hydrocarbons present in the feed) of $A_{9+}$ single-ring aromatic hydrocarbons having at least three methyl groups.

16. The process of claim 5, wherein said $C_{6+}$ non-aromatic cyclic hydrocarbons are $C_6$-$C_{16+}$ non-aromatic cyclic hydrocarbons.

17. The process of claim 15, wherein said $C_6$-$C_{16+}$ non-aromatic cyclic hydrocarbons consist essentially of $C_6$-$C_9$ non-aromatic cyclic hydrocarbons.

18. The process of claim 5, wherein said feed further comprises olefins, diolefins, or mixtures thereof and said feed is treated prior to entering the reaction zone with hydrogen to convert said olefins, diolefins, or mixtures thereof to paraffins or naphthenes.

19. The process of claim 5, wherein said $A_{9+}$ single-ring aromatic hydrocarbons are selected from the group consisting of trimethylbenzenes tetramethylbenzene and mixtures thereof.

20. The process of claim 5, wherein said conditions comprise a temperature from 380 to 580° C., a pressure from 2 to 20 atm (202 to 2020 KPaa), a hydrocarbon weight hourly space velocity between 0.1 and 10 and a hydrogen to hydrocarbon molar ratio from about 0.5 to 10.

21. The process of claim 5, wherein at least a portion of toluene present in said product is recycled to said reaction zone.

22. The process of claim 5, wherein the benzene, toluene, xylenes or mixtures thereof present in said product undergo further conversion without interstage separation of said benzene, toluene, xylenes or mixtures thereof from said product.

23. The process of claim 22, wherein the toluene present in the product undergoes disproportionation to produce xylenes and benzene.

24. The process of claim 23, wherein para-xylene is produced in greater than equilibrium amounts.

25. The process of claim 5, wherein said hydrocarbon feed is derived from a feed stream formed by the cracking of hydrocarbons.

26. The process recited of claim 25, wherein said cracking of hydrocarbons is accomplished in a catalytic cracking process.

27. The process recited of claim 25, wherein said cracking of hydrocarbons is accomplished in a steam cracking process.

28. The process of claim 5, wherein said hydrocarbon feed is a debenzenized steam cracked naphtha.

29. The process of claim 5, wherein said hydrocarbon feed contains greater than 500 wppm of sulfur and at least a portion of said sulfur is removed from said hydrocarbon feed prior to said hydrocarbon feed entering the reaction zone.

30. The process of claim 12, wherein said product contains no more than 1 wppm of sulfur.

31. The process of claim 5, wherein the amount of hydrogen produced by the aromatization of the $C_{6+}$ non-aromatic cyclic hydrocarbons is about equal to the amount of hydrogen consumed in the dealkylation of said $A_{8+}$ single-ring aromatic hydrocarbons.

32. The process of claim 5, wherein said hydrocarbon feed contains from about 7 percent by weight to about 15 percent by weight (based on the weight of the hydrocarbon feed) of $C_{6+}$ non-aromatic cyclic hydrocarbons, about 45 percent by weight to about 75 percent by weight (based on the weight of the hydrocarbon feed) of $A_{8+}$ single-ring aromatic hydrocarbons having at least one alkyl group containing two or more carbon atoms, and about 5 percent by weight to about 20 percent by weight (based on the weight of the hydrocarbon feed) of $A_{9+}$ single-ring aromatic hydrocarbons having at least three methyl groups.

33. The process of claim 32, wherein said $C_{6+}$ non-aromatic cyclic hydrocarbons are selected from the group consisting of methylcyclopentane, ethylcyclopentane, methylcyclopentene, ethylcyclopentene, cyclohexane, methylcyclohexane, ethylcyclohexane, methylcyclohexene and ethylcyclohexene, dihydrocyclopentadienedimer, tetrahydrocyclopentadienedimer, decalins, cyclopentadienes, and cyclohexadienes ethylmethylcyclopentane, and dimethylcyclopentane.

34. The process of claim 33, wherein said $A_{8+}$ single-ring aromatic hydrocarbons having at least one alkyl group containing two or more carbon atoms are selected from the group consisting of ethylbenzene, diethylbenzenes, triethylbenzenes, propylbenzenes, dipropylbenzenes, tripropylbenzenes, isopropylbenzenes, diisopropylbenzenes, triisopropylbenzenes, methylethylbenzenes, dimethylethylbenzenes, trimethylethylbenzenes, methyldiethylbenzenes, dimethyldiethylbenzenes, trimethyldiethylbenzenes, methyltriethylbenzenes, dimethyltriethylbenzene, methylpropylbenzenes, dimethylpropylbenzenes, trimethylpropylbenzenes, ethylpropylbenzenes, diethylpropylbenzenes, and triethylpropylbenzenes and mixtures thereof.

35. The process of claim 5, wherein said hydrocarbon feed contains from about 40 percent by weight to about 50 percent by weight (based on the weight of the hydrocarbon feed) of $A_6$-$A_9$ single-ring aromatic hydrocarbons.

36. The process of claim 5, wherein said product produced by the process contains at least 25 percent by weight of toluene (based on the weight of the benzene, toluene, and xylenes present in the product).

37. The process of claim 5, wherein said hydrocarbon feed further comprises multi-ring aromatics and the conversion takes place in a zone comprising a first reaction zone and a second reaction zone and said forming of aromatic hydrocarbons from $C_{6+}$ non-aromatic cyclic hydrocarbons, said dealkylation of said $A_{8+}$ single-ring aromatic hydrocarbons, said transalkylation of said $A_{9+}$ single-ring aromatic hydrocarbons, and said disproportionating of toluene takes place in said first stage and said multi-ring aromatics are cracked to single-ring hydrocarbons, $C_{6+}$ non-aromatic cyclic hydrocarbons, or mixtures thereof in said second stage.

38. A process for producing an aromatics product selected from the group consisting of benzene, toluene, xylenes, and mixtures thereof from a hydrocarbon feed, said hydrocarbon feed comprising: (a) $C_{6+}$ non-aromatic cyclic hydrocarbons; (b) $A_{8+}$ single-ring aromatic hydrocarbons having at least one alkyl group containing two or more carbon atoms; (c) $A_{9+}$ single-ring aromatic hydrocarbons having at least three methyl groups, and (d) multi-ring aromatics compounds, said process comprising:

(I) contacting said feed in the presence of hydrogen and in a first reaction zone containing a catalyst comprising a large molecular sieve selected from the group consisting of USY, Beta, ZSM-12, MCM-22, and Mordenite and from about 0.05 to about 0.5 percent by weight of a Group VII metal selected from the group consisting of platinum, palladium and mixtures thereof (based on the weight of the molecular sieve), said molecular sieve having an alpha value, before incorporation of said Group VIII metal, from about 3.5 to about 25 and under conditions sufficient for (i) forming aromatic hydrocarbons from $C_{6+}$ non-aromatic cyclic hydrocarbons, (ii) dealkylating $A_{8+}$ single-ring aromatic hydrocarbons having at least one alkyl group containing two or more carbon atoms; (iii) transalkylating $A_{9+}$ single-ring aromatic hydrocarbons having at least three methyl groups; and (iv) disproportionating toluene, to produce a product such that the product contains an increased amount of benzene, toluene, xylenes, or combinations thereof compared to said hydrocarbon feed;

(II) contacting said multi-ring aromatic compounds in a second reaction zone under cracking conditions to convert at least a portion of said multi-ring aromatic compounds to single-ring aromatic compounds, $C_{6+}$ non-aromatic cyclic hydrocarbons; or mixtures thereof; and (III) recycling least a portion of said single-ring aromatic compounds; said $C_{6+}$ non-aromatic cyclic hydrocarbons, or mixtures thereof to the first reaction zone.

39. The process of claim 38, wherein said hydrocarbon feed is derived from FCC Light Cat Cycle Oil or FCC Heavy Cat Naphtha.

40. The process of claim 38, wherein said hydrocarbon feed contains sulfur in a concentration greater than 100 wppm and said product contains no more than 1 wppm.

41. The process of claim 38, wherein said hydrocarbon feed contains $C_{5+}$ acyclic hydrocarbons and at least 90 percent of said $C_{5+}$ acyclic hydrocarbons are cracked to lower boiling products.

* * * * *